United States Patent [19]
Beddies

[11] Patent Number: 6,079,263
[45] Date of Patent: Jun. 27, 2000

[54] COMPOUND WATER METER HAVING IMPELLER ROTATABLY SUPPORTED BETWEEN MAIN METER MEASURING AND SWITCH-OVER VALVE INSETS

[75] Inventor: Uwe Beddies, Hemmingen, Germany

[73] Assignee: H. Meinecke AG, Laatzen, Germany

[21] Appl. No.: 09/062,454

[22] Filed: Apr. 17, 1998

[30] Foreign Application Priority Data

Apr. 18, 1997 [DE] Germany .......................... 197 17 725

[51] Int. Cl.[7] .................................................. G01F 7/00
[52] U.S. Cl. ............................................................ 73/197
[58] Field of Search ................................ 73/197, 861.79, 73/195, 861.82, 118.2; 137/512.1, 875, 518, 535, 536, 537

[56] References Cited

U.S. PATENT DOCUMENTS

| | | | |
|---|---|---|---|
| 3,203,238 | 8/1965 | Whittaker et al. | 73/197 |
| 3,395,578 | 8/1968 | Simonds, Jr. | 73/197 |
| 3,707,872 | 1/1973 | Masson et al. | 73/197 |
| 4,175,434 | 11/1979 | Bradham, III et al. | 73/197 |
| 4,217,929 | 8/1980 | Pelt | 73/197 |
| 5,576,486 | 11/1996 | Paz | 73/197 |
| 5,698,781 | 12/1997 | Zellering | 73/197 |

FOREIGN PATENT DOCUMENTS

| | | |
|---|---|---|
| 0718603 A2 | 5/1995 | European Pat. Off. . |
| 1498396 | 4/1969 | Germany . |
| 2603694 | 8/1977 | Germany . |
| 3429007A1 | 2/1986 | Germany . |
| 3732703 A1 | 9/1988 | Germany . |
| 3740531 A1 | 6/1989 | Germany . |
| 3924147 C2 | 5/1991 | Germany . |
| WO81/03700 | 12/1981 | WIPO . |

*Primary Examiner*—William Oen
*Attorney, Agent, or Firm*—Flanagan & Flanagan; John R. Flanagan; John K. Flanagan

[57] ABSTRACT

A compound water meter includes a housing having opposite inlet and outlet ends, a water guidance channel extending between the inlet and outlet ends and defining a direction of flow therebetween and upper opening disposed above and in communication with the water guidance channel, a main meter measuring inset disposed in the housing across the water guidance channel, a switch-over valve inset disposed in the housing across the water guidance channel and connected watertight with the main meter measuring inset, and an impeller rotatably supported directly by and between the respective insets such that the main meter measuring inset is disposed upstream and the switch-over valve inset downstream of the rotatable impeller relative to the direction of flow. Both insets form an inset unit and with the impeller are suspended in the housing by a cover which closes the upper opening of the housing. The main meter measuring inset has a hub rotatably supporting the impeller. The compound water meter also includes an electronic scanning device for registering the rotational speed of the impeller which is disposed within the hub and an electronic counter disposed on the housing cover which is connected via leads with the electronic scanning device.

19 Claims, 4 Drawing Sheets

COMPOUND WATER METER HAVING IMPELLER ROTATABLY SUPPORTED BETWEEN MAIN METER MEASURING AND SWITCH-OVER VALVE INSETS

CROSS REFERENCE TO RELATED APPLICATION

Reference is hereby made to the following copending application dealing with subject matter related to the present invention: "Switch-Over Valve Having Pivot Axle Articulated Closure Wings" by Uwe Beddies, U.S. Ser. No. 09/061,728, filed Apr. 17, 1998 which copending application is assigned to the same assignee as this application.

BACKGROUND OF THE INVENTION

1. Field of the Invention

The present invention relates to a compound water meter of the type having main and secondary meter devices and a switch-over valve for controlling switching in and out of the main meter device and, more particularly, is concerned with a compound water meter having an impeller rotatably supported by and between main meter measuring and switch-over valve insets which are connected together to form an inset unit suspended by a cover closing an upper opening of the compound water meter housing.

2. Description of the Prior Art

Compound water meters are used in cases in which the measuring range of a simple meter is not sufficient to cover all throughflows which might occur. These compound water meters include a large water meter as the main meter device, a house water meter as a secondary meter device, and a switch-over valve. The switch-over valve controls the switching in and out of the main meter device, which as a rule, is realized as a Woltmann meter and assumes volume measurement only for relatively large predetermined throughflows in addition to the secondary meter device.

Compound water meters are known in which the switch-over valve is implemented as a weight-loaded hinged flap, as disclosed in U.S. Pat. No. 4,100,800, which upon being completely opened gates the throughflow cross section. The weight-loaded hinged flap swivels in the process about a pivot being laterally offset from the throughflow cross section. The disadvantage of this configuration is that for the pivoting of the hinged flap to occur much volume is required which leads to long and heavy compound water meters.

Furthermore are known compound water meters of the above-cited type, for example from German patent document Nos. DE 37 32 703 A1, DE 37 40 531 A1 or DE 39 24 147 C1. In the case of these meters, the closure member of the switch-over valve is guided translationally on an axle located centrally in the direction of flow, and loaded with a spring which presses it counter to the direction of flow into contact on a valve seat. Starting at a predetermined throughflow quantity, the closure member moves away from the valve seat while overcoming the spring force and is displaced in the direction of flow. Thereby an annular throughflow cross section is enabled. Switch-over valves structured in this way have a smaller space requirement compared to the above-cited prior art but are still rather long, which has a negative effect on the length and weight of the compound water meter.

In addition, a main meter measuring inset of known compound water meters is generally structured such that in its measuring volume an impeller is rotatably supported between two hubs of the main meter measuring inset mounted via webs in the measuring volume. In the hub disposed on the downstream side of the impeller a mechanical pickup of the rotational speed of the impeller is taken, for example from a worm gear pinion, which is transmitted via a shaft to a counter. The employment of hubs on both upstream and downstream side of the impeller to rotatably support the impeller and provision of a mechanical pickup in the downstream hub has a further negative effect on the length and weight of the compound water meter.

SUMMARY OF THE PRESENT INVENTION

The present invention provides a compound water meter of the above-cited type which overcomes the aforementioned disadvantages by utilizing a switch-over valve inset together with a main meter measuring inset to rotatably support an impeller and by incorporating an electronic scanning device in an upstream hub of the meter measuring inset supporting the upstream side of the impeller to thereby realize a compound water meter having a shorter overall length and a more compact structure. The switch-over valve located downstream of the main meter measuring inset in any event, can be relocated closer to the main meter measuring inset to provide a bearing site for the downstream side of the impeller eliminating the need to provide a downstream hub for that purpose. The provision of an electronic scanning device in the upstream hub of the main meter measuring inset eliminates the need for a mechanical pickup as well as a downstream hub to hold the mechanical pickup.

Accordingly, the present invention is directed to a compound water meter comprising a housing having opposite inlet and outlet ends and a water guidance channel extending between the inlet and outlet ends and defining a direction of flow therebetween, a main meter measuring inset disposed in the housing and defining a measuring volume disposed in-line with and across the water guidance channel, a switch-over valve inset disposed in the housing across the water guidance channel and connected watertight to the main meter measuring inset, and an impeller disposed in the housing across the water guidance channel and rotatably supported directly by and between the main meter measuring inset and switch-over valve inset such that the main meter measuring inset is disposed upstream and the switch-over valve inset is disposed downstream of the impeller relative to the direction of flow through the water guidance channel. The main meter measuring inset includes a hub engaging and rotatably supporting the impeller at an upstream side thereof and an electronic scanning device disposed within the hub for registering rotational speed of the impeller. The length of the main meter measuring inset/switch-over valve inset unit is thus shortened at least by the length of the hub originally provided downstream of the impeller which has now been eliminated.

A further considerable overall decrease in the structural length of the inset unit is attained by the employment of the switch-over valve which forms the invention of the patent application cross-referenced above in combination with the main meter measuring inset used in the compound water meter of the present invention. The switch-over valve has a valve seat and a closure member being biased opposite to the direction of flow to move to a closed position across the water guidance channel and onto the valve seat. The closure member is movable away from the valve seat to an opened position by a predetermined level of flow through the water guidance channel. The switch-over valve also includes a pivot axle disposed diametrically across the water guidance channel and the closure member is a divided flap having two wings disposed respectively along opposite sides of the pivot axle and hingedly connected one with the other on the pivot axle. The switch-over valve further includes a web disposed upstream of the valve seat and closure member and a bearing pin attached to and extending upstream of the web opposite to the direction of flow which engages and rotatably supports the impeller at a downstream side of the impeller.

In view that the closure member of the switch-over valve is a flap divided into two wings and that both wings pivot about a common axle, the flow through the measuring volume of the main meter measuring inset is enabled without the closure member being translationally moved or swiveled out completely. Both wings require less volume in the open position than previously known switch-over valves. This lower volume requirement can be utilized for a further shortening of the overall length of a compound water meter.

Due to the electronic scanning of the rotational speed of the impeller, the transmitting shaft as well as also the measuring system can be omitted. The volume above the main meter measuring volume in the main meter measuring inset thereby becomes available to utilize advantageously for integrating therein a secondary meter device. Through the combination of main meter measuring inset with an integrated secondary meter and the above-described switch-over valve a compact inset unit is formed which when suspended by a cover which is used to close an upper opening of the housing makes it possible to set the inset unit into a housing of a single meter. An electronic counter is disposed on the housing cover which is connected via leads with the electronic scanning device. Another electronic scanning device can also be associated with the secondary meter device and connected via electrical leads to the electronic counter.

The switch-over valve preferably utilized in the compound water meter of the present invention also produces significantly lower pressure losses than the prior art switch-over valves (for example of German patent document No. DE 37 32 703 A1) in which the closure members remain in the open position in the flow. In the present invention, the closure member of the switch-over valve also remains continuously in the flow, however as the wings open the area of the closure member flowed against but when the wings are opened the area flowed against decreases such that the pressure loss becomes increasingly smaller and is extremely low when the wings of the closure member have reached a completely opened position. The small pressure loss of the divided flap switch-over valve can be utilized for the purpose of decreasing the overall height of the compound water meter in order to arrive at an even more compact structure.

For a further saving of space in the compound water meter of the present invention, the housing is provided with a main portion of the water guidance channel offset downward relative to the inlet and outlet ends thereof which reduces the overall height of the meter. Upstream and downstream portions of the water guidance channel respectively interconnecting the inlet and outlet ends of the housing with the main portion of the water guidance channel are thus provided in oppositely inclined relation to each other producing thereby respectively an oblique inflow and outflow into and from the measuring volume. The higher pressure loss resulting from this guidance of flow in the meter housing in comparison to a straight-line flow guidance is compensated by the low pressure loss of the divided flap switch-over valve.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
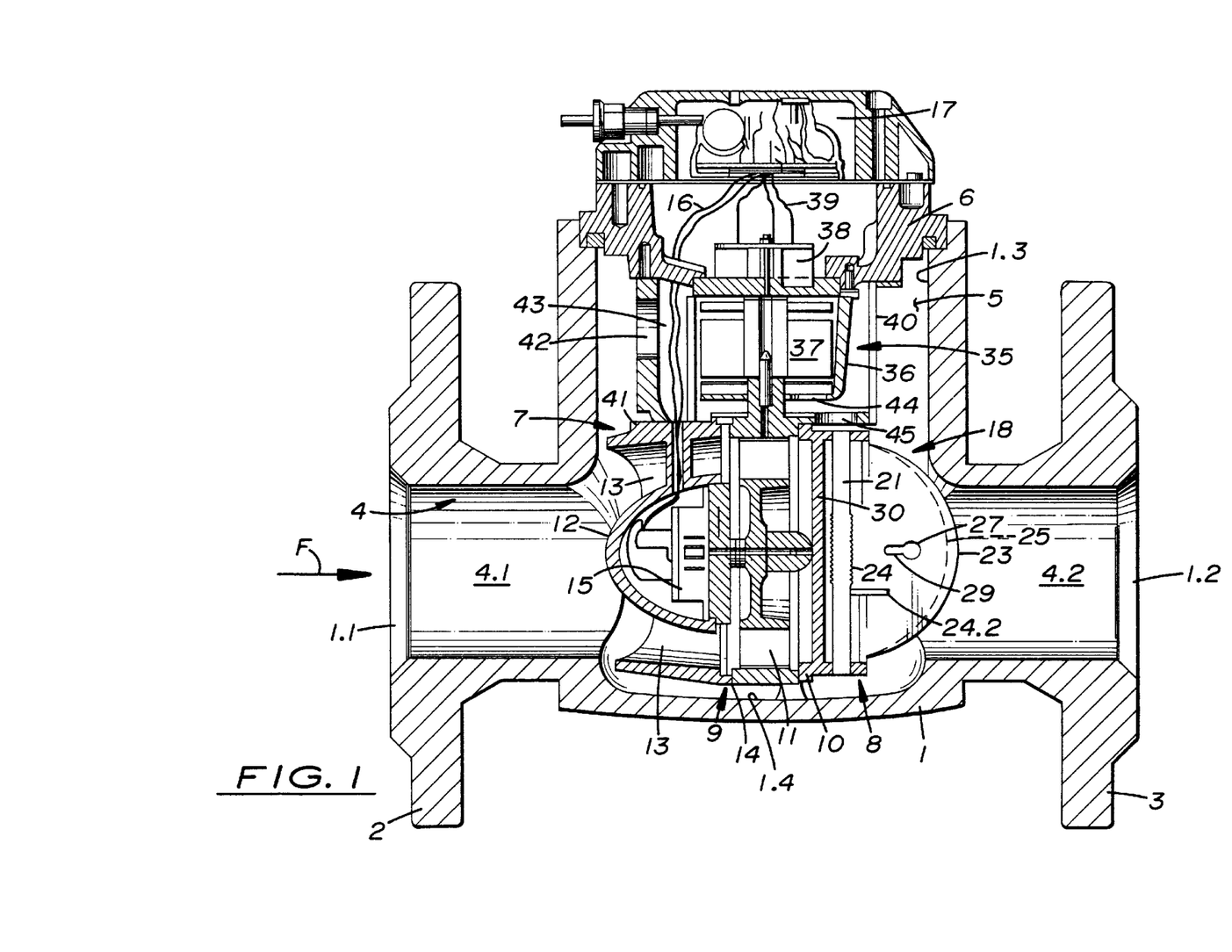
FIG. 1 is a longitudinal section through a first embodiment of a compound water meter of the present invention.

Referring to the drawings and particularly to FIG. 1, there is illustrated in longitudinal section a first embodiment of a compound water meter of the present invention which basically includes a housing 1 having an inflow flange 2 and an outflow flange 3 for the connection to a pipeline. The housing 1 further has a pair of opposite inlet and outlet ends 1.1, 1.2 and an elongated water guidance channel 4 defined therethrough extending between the inlet and outlet ends 1.1, 1.2 and defining a direction of flow through the housing 1, as indicated by an arrow F. The housing 1 further has an upper cavity 5 provided in flow communication with the water guidance channel 4 and extending upwardly therefrom to an upper opening 1.3 of the housing 1. The compound water meter also includes a cover 6 closing the upper opening 1.3 of the housing 1.

The compound water meter further basically includes a main meter measuring inset 7 disposed in the housing 1 and defining a measuring volume disposed in-line with and across the water guidance channel 4, and a switch-over valve inset 8 disposed in the housing 1 across the water guidance channel 4 and connected watertight to the main meter measuring inset 7 so as to form therewith an inset unit 9 suspended in the housing 1 by the cover 6. The housing 1 also has an inner wall 1.4 at least partially forming the water guidance channel 4 and a double-lip seal 10 disposed between and encompassing an exterior surface of the inset unit 9 and the inner wall 1.4 of the housing 1 so as to separate watertight an upstream portion 1.3 of the water guidance channel 4 from a downstream portion 1.4 thereof to prevent flow through the water guidance channel 4 from bypassing the inset unit 9. The inset unit 9 can be slid into the housing 1 through the upper opening 1.3 and cavity 5 into the water guidance channel 4 thereof to where the double-lip seal 10 becomes pressed tightly against the inner wall 1.4 of the housing 1 to provide a watertight sealing relationship with an annular sleeve 14 of the inset unit 9 located approximately in the middle thereof. This implementation has the advantage that the portion of the inner wall 1.4 of the housing 1 which corresponds with the location of the seal 10 does not need to be worked to provide a sealing face.

The compound water meter further includes an impeller 11 disposed in the housing 1 across the water guidance channel 4 and within its measuring volume. The impeller 11 is rotatably supported directly by and between the main meter measuring inset 7 and switch-over valve inset 8 such that the main meter measuring inset 7 is disposed upstream and the switch-over valve inset 8 is disposed downstream of the impeller relative to the direction of flow F through the water guidance channel 4. The main meter measuring inset 7 includes a bell-form hub 12 disposed upstream from the impeller 11 and mounted via webs 13 to the housing 1. The hub 12 engages and rotatably supports the impeller 11 at an upstream side thereof. The compound water meter also includes an electronic scanning device 15 disposed within the hub 12 for registering the rotational speed of the impeller 11.

Figure 3:
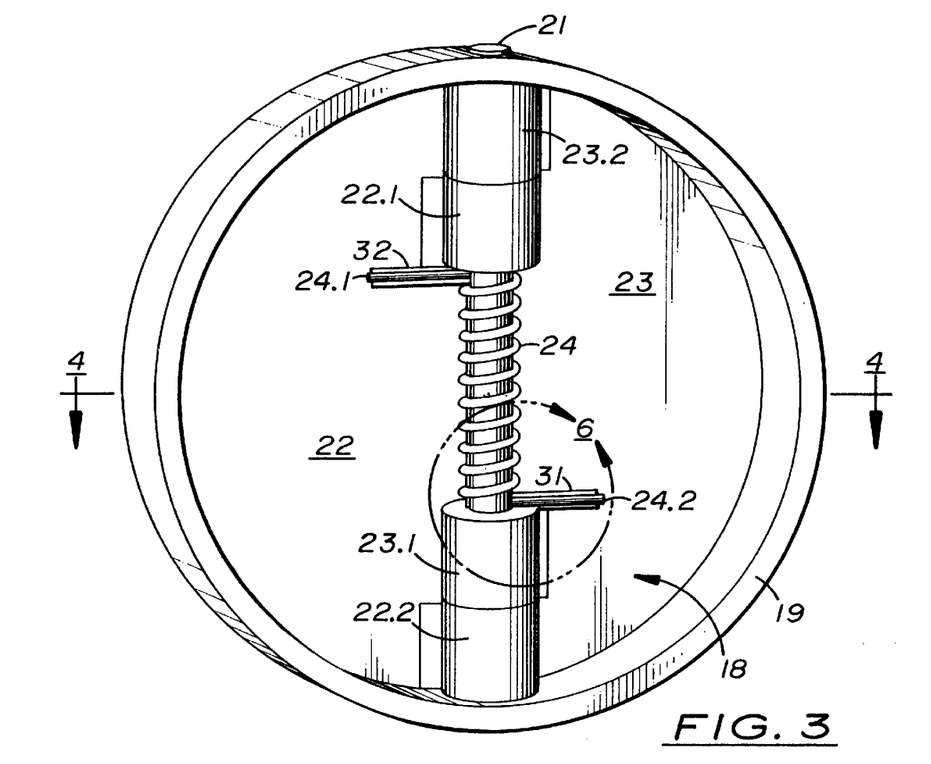
FIG. 3 is a perspective downstream view of a switch-over valve inset of the compound water meter with its switch-over valve shown in a closed position.

In the switch-over valve inset 8 of the inset unit 9 is disposed a switch-over valve 18 whose structure and function will therefore be described in detail herein but which per se forms the invention of the above cross-referenced patent application. The switch-over valve 18 includes an annular-shaped housing 19 defining a central circular throughflow cross section and having an interior continuous flange forming an annular valve seat 20, a pivot axle 21 extending across the diameter of the housing 19 and supported at opposite ends in opposed portions of the housing 19, and a divided flap having a pair of wings 22, 23 disposed along opposite longitudinal sides of the pivot axle 21 and articulated by the pivot axle 21 for movement between opened and closed positions relative to the annular valve seat 20 and the central throughflow cross section as a closure member of the switch-over valve 18. For mounting to the pivot axle 21, the wings 22, 23 of the divided flap are provided with pairs of eyelets 22.1, 22.2 and 23.1, 23.2. Eyelets 22.1, 23.2 of respective wings 22, 23 are disposed side-by-side one another as are eyelets 22.2, 23.1 of the respective wings 22, 23. The eyelets 22.1, 22.2 and 23.1. 23.2 define hollow bores which when aligned with one another allow the pivot axle 21 to penetrate therethrough.

As most clearly apparent in FIG. 3, a middle portion of the pivot axle 21 of the switch-over valve 10 is exposed between the eyelets 22.1 and 23.1. The switch-over valve 18 also includes biasing means such as in the form of a prestressed helical spring 24 disposed around the middle portion of the pivot axle 21. The opposite ends 24.1, 24.2 of the spring 24 respectively rest on the wings 22, 23 and impress the wings 22, 23 in the direction of closure from the opened position of FIG. 5 toward the closed position of FIGS. 3 and 4. The spring force moments are sufficient to hold the wings 22, 23 in contact on the annular valve seat 20, as depicted in FIG. 5, at low throughflows that are not intended to enable the main meter device.

In order to ensure a tight seating of the wings 22, 23 on the annular valve seat 20, the switch-over valve 18 further includes a flat seal 25 made of a stretchible flexible material and disposed on the upstream side of the wings 22, 23 of the divided flap covering a region of separation or division of the flap. With the wings 22, 23 in the closed position of FIG. 4, the outer edge of the flat seal 25 is clamped between peripheral edges of the wings 22, 23 and the annular valve seat 20. The flat seal 25 is secured form-fittingly on the wings 22, 23 of the divided flap by respective nubs 26, 27, seen in FIGS. 4 and 5, attached on the upstream sides of the wings 22, 23. In the region of these nubs 26, 27, the flat seal 25 is provided with longitudinal holes 28, 29 which extend on an imaginary line perpendicularly to the pivot axle 21. For securing the flat seal 25 on the nubs 26, 27, at the region of its longitudinal holes 28, 29 the flat seal 25 can be stretched transversely to the longitudinal extent of the holes 28, 29 so that they will fit over the wider heads of the nubs 26, 27 and behind which the flat seal 25 "snaps" in after it has passed over the nubs 26, 27.

When the wings 22, 23 of the divided flap are opening, the flat seal 25 is flexed about the pivot axle 21, respectively the eyelets 22.1, 22.2, 23.1, 23.2. thereover. This arrangement entailed an enlargement of the area covered by the flat seal 25 as the valve 18 opens toward the fully opened position of FIG. 5 compared to when the valve 18 is in the closed position of FIG. 4. If the flat seal 25 was rigidly fixed on the wings 22, 23 this would lead to a stretching of the flat seal 25. Fatigue tearing of the flat seal 25 would then only be a question of time. In addition, the water volume flow through the water guidance channel 4 would in this case also need to have to overcome the restraining forces of the flat seal 25 on wings 22, 23 as well as the force of the spring 24. These disadvantages are avoided through the guidance of the flat seal 25 in the longitudinal holes 28, 29. Guided on the nubs 26, 27, the flat seal 25 at its peripheral edge can slide away from the edges of wings 22, 23, from the position shown in FIG. 4 inwardly to that shown in FIG. 5, whereby the enlargement of the area about the pivot axle 21 to be covered by the flat seal 25, as mentioned above, is compensated for without stretching of the material of the flat seal 25.

Figure 4:
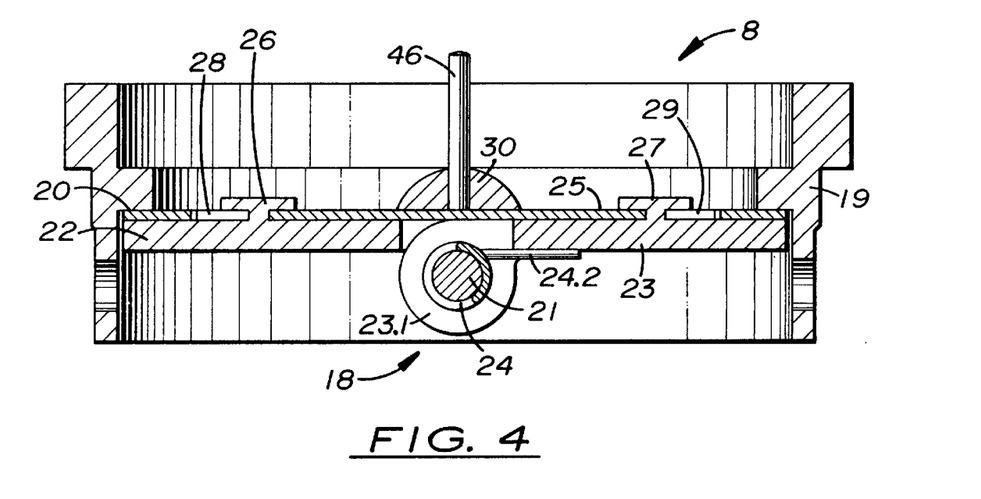
FIG. 4 is a cross-sectional view of the switch-over valve taken along line 4—4 of FIG. 3.
Figure 5:
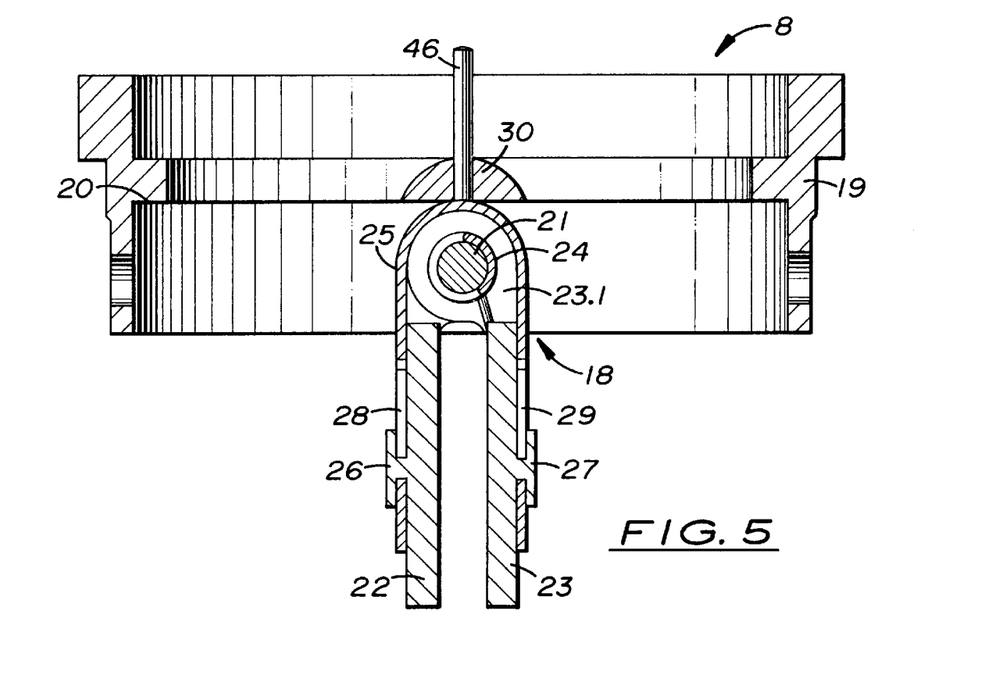
FIG. 5 is another cross-sectional view similar to that of FIG. 4 but showing the switch-over valve in an opened position.

Furthermore, from the depiction of FIG. 4 it can also be realized that the switch-over valve 18 having the two wings 22, 23, the annular valve seat 20, the pivot axle 21, the flat seal 25 and the spring 24 is also excellently suited as a check valve in the event of a reverse flow. To secure the region of the pivot axle 21, which in this case is a problematic region in which gaps are present due to the construction of the divided flap forming the closure member as seen in the direction of the reverse flow, the switch-over valve 18 also includes a web 30 disposed behind the flat seal 25 opposite from the pivot axle 21. The flat seal 25 in the region of the pivot axle 21 cannot therefore be pressed away in the rearward direction in the event of a pressure impact from reverse flow through the throughflow cross section of the valve 18. Also, a bearing pin 46 is attached to and extends upstream of the web 30 opposite to the direction of flow F. The bearing pin 46 is specifically the part of the switch-over valve inset 8 which engages and rotatably supports the impeller 11 at a downstream side thereof.

When the wings 22, 23 of the divided flap are pivotally moved toward the fully opened position of FIG. 5, the prestressed spring 24 is further tensioned. In other words, with increasing angle of opening of the wings 22, 23 the force moments acting from the helical spring 24 onto the wings 22, 23 in the direction of closing of the wings 22, 23 increase. This effect is undesirable since the wings 22, 23 should be allowed to open as far as possible to achieve low pressure losses. For this reason respective opposite ends 24.1, 24.2 of the spring 24 resting on wings 22, 23 are each guided in one of a pair of connecting links or lands 31, 32. The connecting lands 31, 32 are formed as grooves extending in the radial direction and introduced into the wings 22, 23, respectively. The bottom 31 of each of the grooves 31, 32 is thus recessed with respect to the surface of the wings 22, 23. In the transition from the surface of wings 22, 23 to the groove bottom 33 an inclined plane 34 is provided inclined inwardly toward the pivot axle 21. This formation is most clearly evident in FIG. 6 which shows the association between the spring end 24.2 and the connecting land 31. The following explanations refer to this pairing. For the pairing spring end 24.1 and connecting land 32 the same applies analogously.

Figure 6:
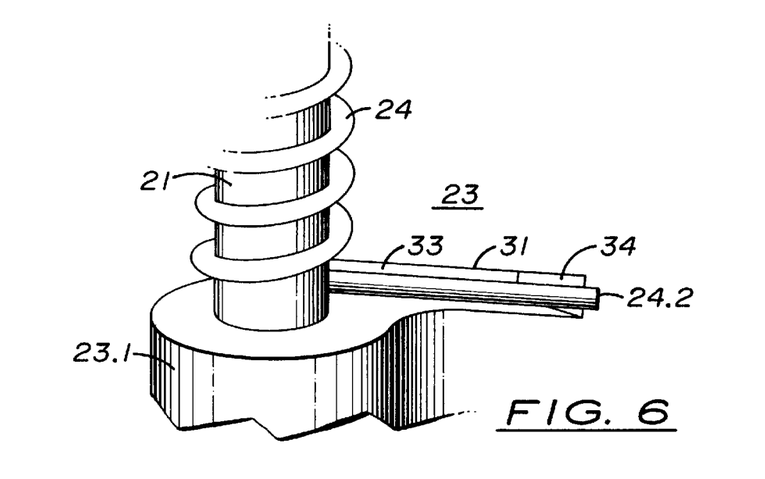
FIG. 6 is an enlarged detailed view of a portion of the switch-over valve enclosed by circle 6 of FIG. 3.

In FIG. 6, it is evident that with the wing 23 in the closed position of FIGS. 3 and 4, the spring end 24.2 is borne on the wing surface. If a specific throughflow quantity is reached, the wing 23 opens toward the opened position of FIG. 5. The spring 24 is therein flexed by a specific amount about the pivot axle 21, causing the length of spring 24 on wing 23 to shorten. With the increasing opening of the wing 23, the spring end 24.2 thereby is moved inwardly toward the pivot axle 21 onto the inclined plane 34 on which it slides backward opposite the direction of flow to the groove bottom 33. In this way the spring force which normally increases with the opening of wing 23 is compensated for and reduced.

Referring again to FIG. 1, the impeller 11 is thus supported on its downstream side directly on the switch-over valve inset 8. The overall length of the inset unit 9, comprised of the main meter measuring inset 7 and the switch-over valve inset 8 with the impeller 11 therebetween, is thereby decreased and because of the low volume requirement of the switch-over valve 18 compared to the prior art, is considerably reduced. Also, within the hub 12 is disposed the electronic scanning device 15, being conventional per se, which is connected via electrical leads 16 with an electronic counter 17 placed onto the housing cover 6. The scanning device 15 and electronic counter 17 per se are conventional components known to those skilled in the art and thus explanations of them further is not necessary for obtaining a clear and thorough understanding of the present invention.

Due to the electronic scanning of the rotational speed of the Woltmann impeller 11, and the absence for that reason of mechanical transmission components, in the main meter measuring inset 7 between the housing cover 6 and the measuring volume additional volume is gained which is utilized to accommodate a secondary meter 35, such as in the form of a standard house water meter. The secondary meter device 35 has a shell 36 and an impeller 37 rotatably supported in the shell 36 with the orientation of its rotational axis substantially perpendicular to that of the Woltmann impeller 11 of the main meter measuring insert 7. The secondary meter device 35 is arranged with another electronic scanning device 38, being conventional per se, for detecting electronically the rotational speed of its impeller 37. Electrical conductors 39 lead from the electronic scanning device 38 to the counter 17. The counter 17 receives measurement signals from the main meter measuring inset 7 as well as also from the secondary meter device 35, processes both signals and can display them individually or as a sum.

The shell 36 of the secondary meter device 35 is disposed within a cylindrical boundary wall 40 of the main meter measuring inset 7, which at the top is connected watertight with the cover 6 and at the bottom watertight with a wall 41 of the measuring volume 8. In the wall 40 as well as in the shell 36 there are provided respective inlet openings 42, 43 and outlet openings 44, 45 for the water throughflow through the secondary meter device 35.

The disposition described above of the secondary meter device 35 in the main meter measuring inset 7 contributes to further compactness of the compound water meter, which operates as follows. Below a predetermined throughflow limit, the switch-over valve 18 is closed and the entire quantity of water flows through the region above the main meter measuring volume 8. It flows from the meter housing inlet 1.1 through the upstream portion 4.1 of the water guidance channel 4 to and through the inlet opening 42 in the wall 40 and the inlet opening 43 in the wall of shell 36 to the impeller 37 of the secondary meter device 35 and subsequently flows via the outlet opening 44 in the shell 36 and outlet opening 45 in wall 40 in the direction through the downstream portion 4.2 of the water guidance channel 4 to and through the meter housing outlet 1.2. Above the predetermined throughflow limit, the switch-over valve 18 is opened and the major portion of the quantity of water flows through the measuring volume 8 of the main meter measuring inset 7, while a smaller portion takes again the above described path via the secondary meter device 35.

Figure 2:
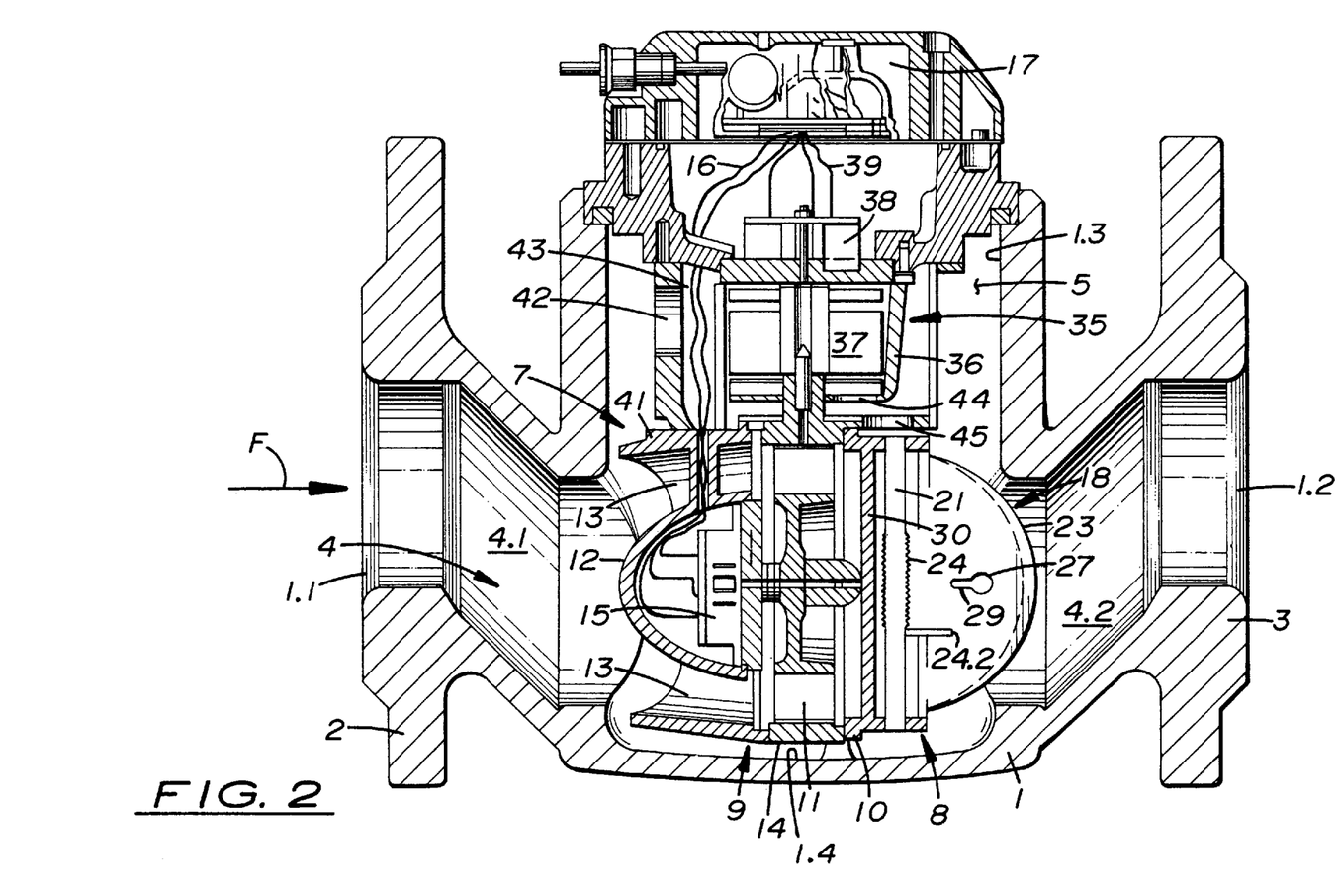
FIG. 2 is a longitudinal section through a second embodiment of a compound water meter of the present invention.

Referring to FIG. 2, there is illustrated a second embodiment of the compound water meter of the present invention. The inset unit 9 suspended from the housing cover 6, which includes the main meter measuring inset 7 (with integrated secondary meter device 35), the switch-over valve inset 8 and the impeller 11 supported between them, in terms of structure and function is completely identical with that of the above-described preceding first embodiment of the compound water meter. The inset unit 9 can be set as a unit into the housing 1 and respectively removed from it. The inset unit 9 forms an independent unit, which can be calibrated or certified by itself and virtually be set into a housing implemented in any desired way.

The sole difference of the second exemplary embodiment of the compound water meter from the first exemplary embodiment thereof is that the center portion of the housing 1 to the lower edge of inflow flange 2 and outflow flange 3 is offset downward. This implementation has the substantial advantage that the overall height of the compound water meter is substantially reduced which becomes very evident in a comparison of the respective depictions of the compound water meter of FIGS. 1 and 2. As a result of the downward offset of the housing center portion, a main portion of the water guidance channel 4 between its upstream and downstream portions 4.1, 4.2 is offset downward and the upstream and downstream portions 4.1, 4.2 extend oppositely sloping or obliquely relative to one another toward and away from the measuring volume. This angular flow guidance through the housing 1 in FIG. 2, in comparison to the straight-line flow guidance through the housing 1 in FIG. 1, results in higher pressure losses which, however can be accepted since the switch-over valve 18 itself causes lower pressure losses. With conventional switch-over valves such flow guidance would not be possible for reasons of space requirement and pressure losses.

A decrease of the overall height of the compound water meter can also be attained in a different way in a still further third embodiment of the compound water meter of the present invention. In the third embodiment, the free volume between the lower edges of inflow and outflow flanges 2, 3 and the underside of the meter housing 1 is also utilized. In the third embodiment the housing of main meter measuring inset 7 is extended downwardly to integrate the secondary meter device 35 placed into the volume created below, instead of above, the main meter measuring inset 7. In the third embodiment the secondary meter device 35 is thus disposed underneath the main meter measuring volume. Compared to the second embodiment, the third embodiment has the advantage that the water is guided in a straight line by the water guidance channel 4 extending straight through the housing 1. This results in lower pressure losses.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiments thereof.

I claim:

1. A compound water meter, comprising:
   (a) a housing having opposite intlet and outlet ends and a water guidance channel extending between said inlet and outlet ends and defining a direction of flow therebetween;
   (b) a main meter measuring inset disposed in said housing and defining a measuring volume disposed in-line with and across said water guidance channel, said main meter measuring inset including a hub;
   (c) a switch-over valve inset disposed in said housing across said water guidance channel and connected watertight to said main meter measuring inset; and
   (e) an impeller having an upstream side and a downstream side and being disposed in said housing across said water guidance channel such that at said upstream side said impeller is engaged by said hub of said main meter measuring inset and rotatably supported directly by said hub of said main meter measuring inset between said main meter measuring inset and said switch-over valve inset with said main meter measuring inset being disposed adjacent to said upstream side and said switch-over valve inset being disposed adjacent to said downstream side of said impeller relative to said direction of flow through said water guidance channel;
   (f) said main meter measuring inset also including an electronic scanning device disposed within said hub of said main meter measuring inset adjacent to said upstream side of said impeller for registering the rotational speed of said impeller.

2. The meter of claim 1 wherein said switch-over valve inset includes:
   a switch-over valve having a valve seat and a closure member being biased opposite to the direction of flow to move to a closed position across said water guidance channel and onto said valve seat, said closure member being movable away from said valve seat to an opened position by a predetermined level of flow through said water guidance channel;
   a web disposed upstream of said valve seat and said closure member of said switch-over valve; and
   a bearing pin attached to and extending upstream of said web opposite to said direction of flow, said bearing pin engaging and rotatably supporting said impeller at a downstream side of said impeller.

3. The meter of claim 1 wherein said switch-over valve inset includes a switch-over valve having a valve seat and a closure member being biased opposite to the direction of flow to move to a closed position across said water guidance channel and onto said valve seat, said closure member being movable away from said valve seat to an opened position by a predetermined level of flow through said water guidance channel.

4. A compound water meter, comprising:
   (a) a housing having opposite inlet and outlet ends and a water guidance channel extending between said inlet and outlet ends and defining a direction of flow therebetween;
   (b) a main meter measuring inset disposed in said housing and defining a measuring volume disposed in-line with and across said water guidance channel;
   (c) a switch-over valve inset disposed in said housing across said water guidance channel and connected watertight to said main meter measuring inset; and
   (d) an impeller disposed in said housing across said water guidance channel and rotatably supported directly by and between said main meter measuring inset and said switch-over valve inset such that said main meter measuring inset is disposed upstream and said switch-over valve inset is disposed downstream of said impeller relative to said direction of flow through said water guidance channel;
   (e) said switch-over valve inset including
      (i) a switch-over valve having a valve seat and a closure member being biased opposite to the direction of flow to move to a closed position across said water guidance channel and onto said valve seat, said closure member being movable away from said valve seat to an opened position by a predetermined level of flow through said water guidance channel, and
      (ii) a pivot axle disposed diametrically across said water guidance channel, said closure member being a divided flap having two wings disposed respectively along opposite sides of said pivot axle and hingedly connected one with the other on said pivot axle.

5. The meter of claim 4 wherein said switch-over valve further includes a flat seal of flexible material disposed on and at least partially covering an upstream side of said divided flap.

6. The meter of claim 5 wherein said switch-over valve inset further includes a web disposed upstream of said flat seal opposite said pivot axle such that said flat seal is held in close contact on said flap by said web.

7. The meter of claim 6 wherein said switch-over valve inset further includes a bearing pin attached to and extending upstream of said web opposite to said direction of flow, said bearing pin engaging and rotatably supporting said impeller at a downstream side of said impeller.

8. The meter of claim 4 wherein said main meter measuring inset includes a hub engaging and rotatably supporting said impeller at an upstream side of said impeller.

9. The meter of claim 4 wherein said main meter measuring inset includes:
   a hub; and
   an electronic scanning device disposed within said hub for registering the rotational speed of the impeller.

10. A compound water meter, comprising:
   (a) a housing having opposite inlet and outlet ends and a water guidance channel extending between said inlet and outlet ends and defining a direction of flow therebetween;
   (b) a main meter measuring inset disposed in said housing and defining a measuring volume disposed in-line with and across said water guidance channel;
   (c) a switch-over valve inset disposed in said housing across said water guidance channel and connected watertight to said main meter measuring inset; and
   (d) an impeller disposed in said housing across said water guidance channel and rotatably supported directly by and between said main meter measuring inset and said switch-over valve inset such that said main meter measuring inset is disposed upstream and said switch-over valve inset is disposed downstream of said impeller relative to said direction of flow through said water guidance channel;
   (e) said water guidance channel having a main portion and a pair of opposite upstream and downstream portions respectively interconnecting said main portion to said opposite inlet and outlet ends of said housing, said main portion being offset below said opposite inlet and outlet ends of said housing.

11. The meter of claim 10 wherein said upstream and downstream portions of said water guidance channel are respectively oppositely sloped relative to one another.

12. A compound water meter, comprising:
- (a) a housing having opposite inlet and outlet ends, a water guidance channel extending between said inlet and outlet ends and defining a predetermined direction of flow from said inlet end to said outlet end, and an upper opening disposed above and in communication with said water guidance channel;
- (b) a cover closing said upper opening of said housing;
- (c) a main meter measuring inset disposed in said housing and defining a measuring volume disposed in-line with and across said water guidance channel, said main meter measuring inset including a hub;
- (d) a switch-over valve inset disposed in said housing across said water guidance channel and connected watertight to said main meter measuring inset so as to form an inset unit therewith suspended in said housing by said cover; and
- (e) an impeller having an upstream side and a downstream side and being disposed in said housing across said water guidance channel such that at said upstream side said impeller is engaged by said hub of said main meter measuring inset and rotatably supported directly by said hub of said main meter measuring inset between said main meter measuring inset and said switch-over valve inset with said main meter measuring inset being disposed adjacent to said upstream side and said switch-over valve inset being disposed adjacent to said downstream side of said impeller relative to said direction of flow through said water guidance channel;
- (f) said main meter measuring inset also including an electronic scanning device disposed within said hub of said main meter measuring inset adjacent to said upstream side of said impeller for registering the rotational speed of said impeller.

13. The meter of claim 12 wherein:
said water guidance channel has an upstream portion and a downstream portion; and
said housing has an inner wall at least partially forming said water guidance channel and a double lip seal disposed between an exterior surface of said inset unit and said inner wall of said housing separating watertight said upstream and downstream portions of said water guidance channel from one another so as to prevent flow through said water guidance channel from bypassing said inset unit.

14. The meter of claim 12 further comprising:
a secondary meter device disposed in said housing between said inset unit and said cover.

15. The meter of claim 12 wherein said switch-over valve inset includes:
a switch-over valve having a valve seat and a closure member being biased opposite to the direction of flow to move to a closed position across said water guidance channel and onto said valve seat, said closure member being movable away from said valve seat to an opened position by a predetermined level of flow through said water guidance channel;
a web disposed upstream of said valve seat and said closure member of said switch-over valve; and
a bearing pin attached to and extending upstream of said web opposite to said direction of flow, said bearing pin engaging and rotatably supporting said impeller at a downstream side of said impeller.

16. The meter of claim 12 wherein said main meter measuring inset includes a hub engaging and rotatably supporting said impeller at an upstream side of said impeller.

17. The meter of claim 12 wherein said main meter measuring inset includes:
a hub; and
an electronic scanning device disposed within said hub for registering the rotational speed of the impeller.

18. The meter of claim 12 further comprising:
an electronic counter disposed on said cover and electrically connected via leads to said electronic scanning device.

19. A compound water meter, comprising:
- (a) a housing having opposite inlet and outlet ends, a water guidance channel extending between said inlet and outlet ends and defining a predetermined direction of flow from said inlet end to said outlet end, and an upper opening disposed above and in communication with said water guidance channel, said water guidance channel having a main portion and a pair of opposite upstream and downstream portions respectively interconnecting said main portion to said opposite inlet and outlet ends of said housing, said main portion of said water guidance channel being offset below said opposite inlet and outlet ends of said housing, said upstream and downstream portions of said water guidance channel respectively oppositely sloping relative to one another;
- (b) a cover closing said upper opening of said housing;
- (c) a main meter measuring inset disposed in said housing and defining a mearsuring volume disposed in-line with and across said water guidance channel;
- (d) a switch-over valve inset disposed in said housing across said water guidance channel and connected watertight to said main meter measuring inset so as to form an inset unit therewith suspended in said housing by said cover; and
- (e) an impeller disposed in said housing across said water guidance channel and rotatably supported directly by and between said main meter measuring inset and said switch-over valve inset such that said main meter measuring inset is disposed upstream, and said switch-over valve inset is disposed downstream, of said impeller relative to said direction of flow through said water guidance channel.

* * * * *